(No Model.) 2 Sheets—Sheet 2.
E. CLIFF.
CAR TRUCK.
No. 531,835. Patented Jan. 1, 1895.
Fig. 4.
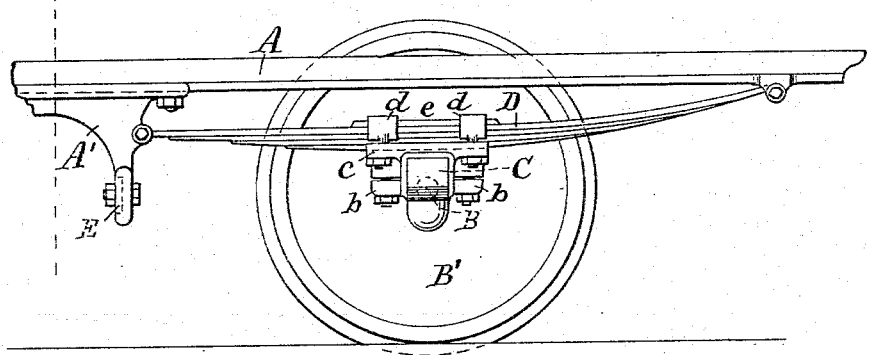
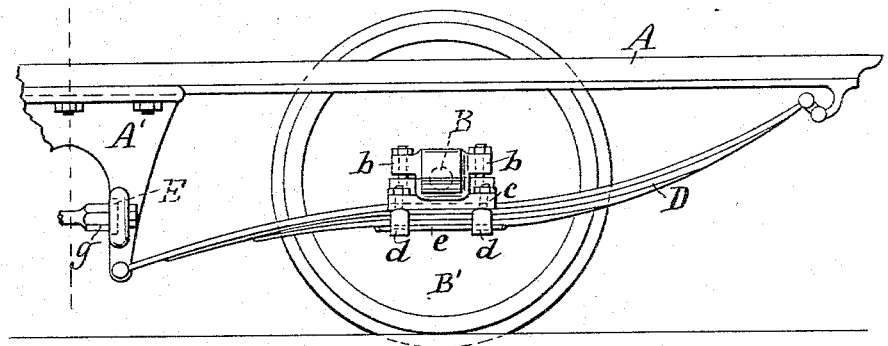
Fig. 5.
Witnesses:
Mark W. Dewey
R. S. Dewey
Inventor.
Edward Cliff
By C. H. Duell
his Attorney.

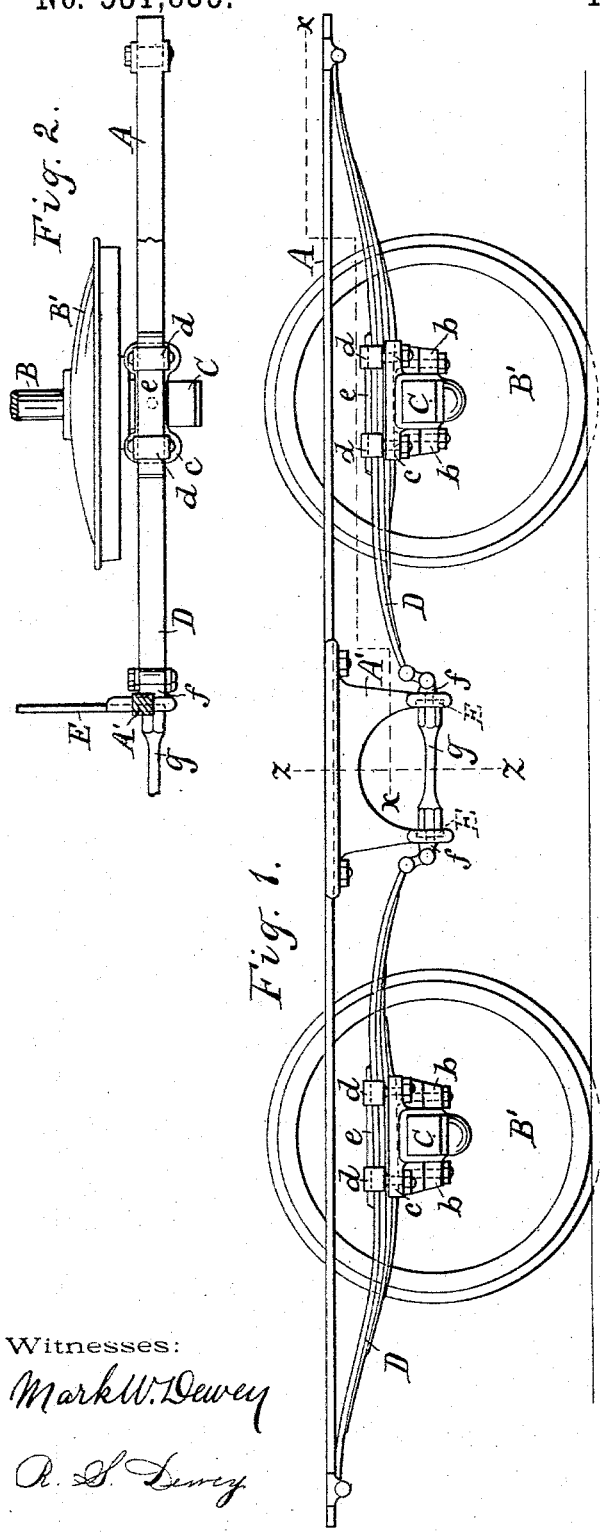

UNITED STATES PATENT OFFICE.

EDWARD CLIFF, OF NEWARK, NEW JERSEY.

CAR-TRUCK.

SPECIFICATION forming part of Letters Patent No. 531,835, dated January 1, 1895.

Application filed August 13, 1894. Serial No. 520,149. (No model.)

*To all whom it may concern:*

Be it known that I, EDWARD CLIFF, a citizen of the United States, residing at Newark, in the county of Essex, in the State of New Jersey, have invented new and useful Improvements in Car-Trucks, of which the following, taken in connection with the accompanying drawings, is a full, clear, and exact description.

My invention relates to car-trucks, particularly street-car or motor-trucks, and the object is to provide a very easy-riding truck that will be simple, light and durable, and that will have few parts in its structure, which parts will be so connected together and arranged that great flexibility will be obtained and rigidity overcome.

In carrying out my invention I dispense with the lower or stationary frame of the truck, rigid guides for the axle-boxes and with the coil-springs, using and depending entirely upon elliptic or semi-elliptic springs.

To this end my invention consists in the combination of the movable truck frame on which the body is supported, the wheels and axles turning together and the axle-boxes on the axles, with semi-elliptic springs mounted on said boxes and connected to the said frame; and my invention consists in certain other combinations of parts hereinafter described and specifically set forth in the claims.

In the drawings hereto annexed and forming a part of this specification, Figure 1 is a side elevation of my improved truck. Fig. 2 is a top plan and longitudinal transverse sectional view of a portion of the truck taken on line $x, x$ of Fig. 1. Fig. 3 is a vertical transverse section of a portion of the truck on line $z, z$ of Fig. 1, and Figs. 4 and 5 show modifications of my invention.

Referring specifically to the drawings, A represents the frame upon which the body of the car rests, or what is usually termed the upper or movable frame of a car-truck.

B, B are the axles.

B' B' are the wheels, integral with or securely and rigidly mounted upon the axles to turn therewith, and C, C are the axle-boxes mounted on the ends of the axles outside of the wheels, for the axles to turn in. These axle-boxes are provided with suitable bearings $c$ for the semi-elliptic springs D which are securely fastened to the bearings by clips $d, d$ passing around the springs at or near their centers. In Figs. 1 and 2 the springs are mounted on the upper sides of the boxes but they may be mounted on the lower sides as shown in Fig. 5. The lower parts of the elliptic springs are employed. The ends of the springs are secured to the frame above either rigidly as shown in Fig. 4, or flexibly as shown in Figs. 1 and 5 by a rigid connection at one end of the spring and a link at the opposite end. The rigid connections may however have inserted between the parts, that is, between the eye of the spring and the bolt passing therethrough, a rubber ring, as is often used in shaft couplings to prevent rattling.

In order to secure the spring firmly and rigidly to the axle-box, I cast lugs $b$ on opposite sides of the box each provided with a vertical perforation to receive a bolt passing through the spring support $c$. Said support $c$ is preferably formed in the shape of a saddle which fits and lies in a groove cast in the side or sides of the axle-box. The clips $d, d$ are held separated by a grooved plate $e$ lying between the spring and the clips, the latter lying in the grooves. The ends of the clips pass through the corners of the spring support $c$ and are held therein by nuts, as shown.

A' is a hanger or support for the inner ends of the springs D and the cross bars E, E. Said hanger is secured to the frame of the truck midway between the axles or at the center on each side of the frame. Said hanger may be shaped in various ways but has preferably two depending portions an equal distance from and on opposite sides of the center of the truck, which are provided with grooves or sockets in which lie the ends of the cross bars E, E which extend across the truck and to which the motors may be connected or secured. In Fig. 1 I show a turn buckle $g$ between these depending portions which strengthens and binds them together. The lugs $f, f$ to which the inner ends of the springs are linked, are provided with threaded bolts which extend through the hanger and cross-bars and enter the ends of the turn buckle $g$ which latter securely holds them in place. I preferably link one end of each spring to the frame, or the hanger secured thereto, as shown. In Fig. 1, the inner ends of the springs are connected to the hanger by links and in Fig. 5 the outer ends are so connected.

I do not wish to be limited to the precise or exact mode of construction shown, as said construction may be changed in various ways without departing from my invention as will be apparent from the different modifications shown.

By my invention another great advantage is gained, namely, a relative movement of the wheels and axles, that is, within certain limits, of course, during the travel of the truck they may move toward and from the center, and that without noise or rattling of any kind. This construction completely overcomes all grinding, grating and wearing noticeable in all street car trucks up to the present time.

Another advantage derived by this construction is that each of the axles with the wheels may be removed from the frame by the removal of four bolts; the bolts passing through the ends of the springs.

Any suitable packing may be placed between the axle-boxes and the spring supports c, if desired.

Having described my invention, what I claim as new, and desire to secure by Letters Patent, is—

1. The combination of the movable truck frame, the rotatable wheels and axles, and the axle-boxes, with semi-elliptic springs mounted upon the upper side of and secured to the said axle-boxes, and connected at their ends to the said frame, said axle-boxes being without guides and free to move relatively to each other, as set forth.

2. The combination of the movable truck frame, the rotatable wheels and axles, and the axle-boxes, with semi-elliptic springs mounted upon and secured to said boxes, said axle-boxes being without guides and free to move relatively to each other, hangers at the center on each side of the truck frame, cross bars extending between the hangers, the said springs being connected at their inner ends by links to the hangers while their outer ends are directly connected to the frame, substantially as described and shown.

3. The combination of the movable truck frame, the rotatable wheels and axles, and the axle-boxes, with semi-elliptic springs mounted upon and secured to said boxes, hangers at the center on each side of the truck frame, studs provided with bolts extending through the hangers, turn-buckles each connecting a pair of said studs together, links connecting the studs with the inner ends of the said springs, and suitable couplings between the outer ends of the springs and the truck-frame, substantially as described and shown.

In testimony whereof I have hereunto signed my name.

EDWARD CLIFF. [L. S.]

Witnesses:
GEO. H. GRAHAM,
E. L. TODD.